US006698653B1

(12) United States Patent
Diamond et al.

(10) Patent No.: US 6,698,653 B1
(45) Date of Patent: Mar. 2, 2004

(54) IDENTIFICATION METHOD, ESPECIALLY FOR AIRPORT SECURITY AND THE LIKE

(76) Inventors: Mel Diamond, 12 Bretton Rd., Scarsdale, NY (US) 10583; Raymond R. Renouf, 300 Long Botton Rd., Southington, CT (US) 06489

( * ) Notice: Subject to any disclaimer, the term of this patent is extended or adjusted under 35 U.S.C. 154(b) by 0 days.

(21) Appl. No.: 09/429,180

(22) Filed: Oct. 28, 1999

(51) Int. Cl.[7] ........................... G06F 17/00; G06K 5/00

(52) U.S. Cl. ....................................... 235/375; 235/382

(58) Field of Search ................................ 235/375, 382, 235/384

(56) References Cited

U.S. PATENT DOCUMENTS

| | | | | |
|---|---|---|---|---|
| 4,711,994 A | | 12/1987 | Greenberg | 235/384 |
| 4,754,487 A | * | 6/1988 | Newmuis | 382/2 |
| 5,051,565 A | | 9/1991 | Wolfram | 235/384 |
| 5,163,094 A | * | 11/1992 | Prokoski et al. | 382/2 |
| 5,225,990 A | | 7/1993 | Bunce | 364/478 |
| 5,401,944 A | | 3/1995 | Bravman | 235/375 |
| 5,432,864 A | * | 7/1995 | Lu et al. | 382/118 |
| 5,466,918 A | * | 11/1995 | Ray et al. | 235/380 |
| 5,478,991 A | | 12/1995 | Watanabe | 235/375 |
| 5,594,806 A | | 1/1997 | Colbert | 382/115 |
| 5,754,675 A | | 5/1998 | Valadier | 382/115 |
| 5,768,140 A | | 6/1998 | Swartz | 364/478.13 |
| 5,787,186 A | | 7/1998 | Schroeder | 382/115 |
| 5,789,726 A | | 8/1998 | Ray | 235/380 |
| 5,793,639 A | | 8/1998 | Yamazaki | 364/478.14 |
| 5,850,470 A | | 12/1998 | Kung | 382/157 |
| 6,085,976 A | * | 7/2000 | Sehr | 235/384 |
| 6,108,636 A | * | 8/2000 | Yap et al. | 705/5 |
| 6,111,506 A | * | 8/2000 | Yap et al. | 340/572.1 |
| 6,219,439 B1 | * | 4/2001 | Burger | 382/115 |

* cited by examiner

*Primary Examiner*—Michael G. Lee
*Assistant Examiner*—April Nowlin
(74) *Attorney, Agent, or Firm*—Herbert Dubno

(57) ABSTRACT

An identification method and equipment, especially for airports and like controlled access facilities acquires an image of the face of an individual in a limited region including the eyes and nose and generates data representing a compression of that image and which can be stored in a data base and on a chip. A boarding pass and a baggage tag can each be on a respective chip, the compressed facial data of which can be compared with a data base to verify the individual and his or her baggage.

17 Claims, 7 Drawing Sheets

CyberID Boarding Pass and Baggage Tag with Embedded RFID Microchips.
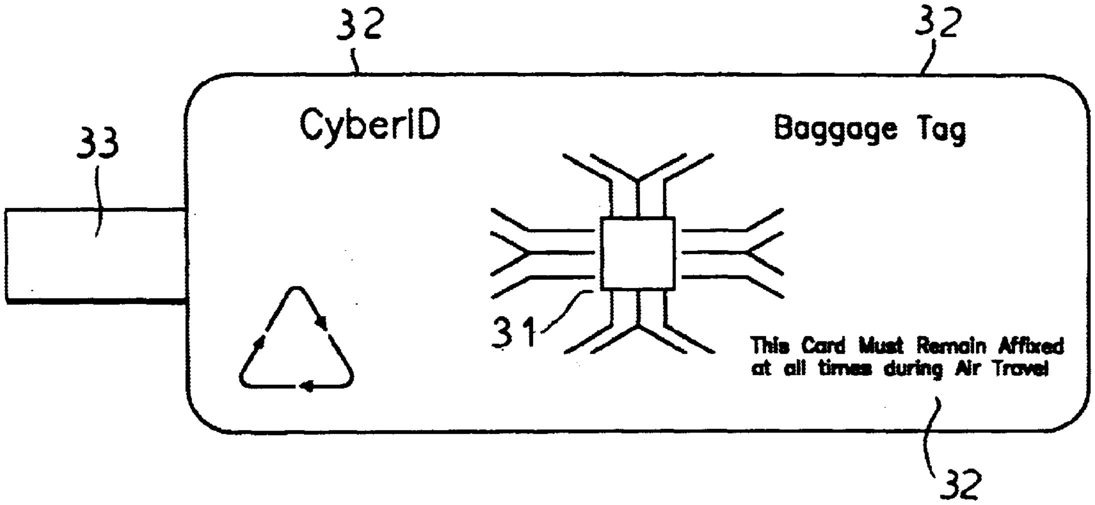
FIG.3
FIG.4
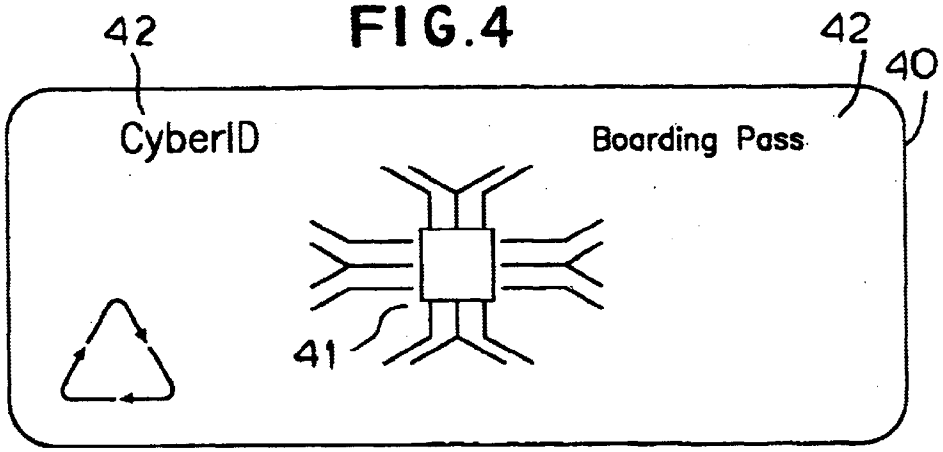

CyberID *FAST*flite™ Automated Ticketing and Check-in Station

IDENTIFICATION METHOD, ESPECIALLY FOR AIRPORT SECURITY AND THE LIKE

FIELD OF THE INVENTION

Our present invention relates to an identification method, especially for airport security and the like which can be used for passenger identification, baggage/passenger matching, neonate identification, weapons identification, visa and passport applications, events security at sports events, conventions, amusement parks and theme parks, access control in a variety of facilities and for driver licenses, vehicle registration and the like and even for rapid ticketing, especially for airports and the like.

More particularly, the invention relates to an identification method utilizing facial image features and capable of registering a facial image with a minimum of data in or on any card, document, object or thing for association thereof with an individual and enabling an accurate data base storage for a stored image of that individual for comparison of registered images for a variety of purposes.

BACKGROUND OF THE INVENTION

Various identification projects have been proposed heretofore for baggage management and like purposes and, for example, it is common practice to require matching of stubs carried by passengers with baggage tags at airports and other transportation facilities, to require individuals to identify themselves with photo I.D.s at airport check-in facilities and to require individuals to provide identifying fingerprints, hand prints and the like for access to facilities.

While all of these techniques have been used successfully, there remains a need for greater security at airports and other transportation facilities, at sensitive buildings and wherever association of an individual with an object, article, background or document is required.

The aviation industry has been facing increasing pressure from governmental regulatory authorities and the U.S. political leadership to bring their outdated airport security systems into the 21st century, especially after the terrorist bombing of Pan Am 103 and the crash of TWA Flight 800. The 1997 White House Commission Report on Aviation Safety and Security, chaired by Vice-President Al Gore, emphasized the need for the FAA to establish new security standards as defined by Federal Aviation Agency Regulations. The Commission proclaimed that an issue of high priority should be the development of an automated system to provide Positive Passenger Baggage Matching (PPBM) incorporating automated passenger baggage matching technology and automated passenger profiling that eliminates the possibility that any passenger can check baggage onto a flight that they themselves do not take.

In addition, in other fields there is a need for positive identification of an individual with an object or other individuals which can utilize more or less remote identifications, i.e. the detection of identifying data at a location spaced from the object on which that data is stored. For example, it is often important to ensure that a child or an infant is associated with the individual accompanying him or her upon leaving a hospital, school, theme park or the like so as to be certain that the child is not being abducted and for that purpose positive identification of the accompanying adult with the child may be essential.

Furthermore, with respect to the ownership and possession of hand guns and long guns, it may be important to be certain of the owner or the identity of the individual found in possession of the weapon and to provide an immediate identification which can be cross-checked with central facilities.

It is always important for immigration and transportation facilities to be able to verify the individual carrying a passport, identity card, visa or the like and even a travel document, driver's license or like card or paper. Furthermore, positive identification of individuals can include the matching of individuals to their possessions or baggage, the matching of individuals to tickets or the like sold to such individuals, the ability to control access to all kinds of facilities to authorized individuals, and the ability to police airports and the like to be certain that access has not been afforded to individuals who are suspected of criminal or terrorist activities. Finally, it is desirable to provide rapid identification of a possession analogous to that which obtains with the use of a photo I.D., to improve the efficiency of checking at transportation facilities and the like.

OBJECTS OF THE INVENTION

It is, therefore, the principal object of the present invention to provide an improved identification method which will overcome the disadvantages of the earlier approaches and facilitate rapid and accurate identification of individuals, objects with individuals, individuals with documents and documents or objects with one another.

Another object of the invention is to provide an improved airport security system which will provide assurance that only baggage associated with an actual passenger is placed aboard an aircraft which can provide positive identification of a passenger to prevent substitution or fraud or criminal or terrorist activity, to ensure positive baggage identification upon termination of a flight and to ensure security within the airport at all stages from entry into the facility through check-in, boarding and baggage retrieval.

It is also an object of this invention to provide an improved method of document and object identification whereby drawbacks with earlier document and object identification can be avoided.

SUMMARY OF THE INVENTION

These objects are attained, in accordance with the invention in an identification method which, in its broadest terms, comprises the steps of:

(a) at a first location, acquiring an image of a face of an individual, scanning a characteristic portion of the acquired image, and generating digital data representing a compressed image of the face of the individual;

(b) storing the image in a database;

(c) recording the digital data representing the compressed image on a first readable medium moving independently of the individual;

(d) at another location, reading the digital data recorded on the first readable medium, and selectively:

(d1) comparing the read digital data with images stored in the database, and displaying a stored image matching the read data to verify a relationship between the individual and the first readable medium at the other location, and (d2) comparing the read digital data with digital data representing another stored image on a second readable medium corresponding to the first readable medium but capable of moving independently of the first readable medium.

In particular, the method of the invention can comprise the steps of:

(a) at a first location, acquiring an image of a face of an individual, scanning a characteristic portion of the acquired image, and generating digital data representing a compressed image of the face of the individual;

(b) storing the image in a database;

(c) recording the digital data representing the compressed image on a single-use disposable chip carried by the individual; and (d) at another location, reading the digital data recorded on the chip, comparing the read digital data with images stored in the database, and displaying a stored image matching the read data to verify a relationship between the individual and chip at the other location.

Alternatively, the method can comprise the steps of:

(a) at a first location, acquiring an image of a face of an individual, scanning a characteristic portion of the acquired image, and generating digital data representing a compressed image of the face of the individual;

(b) storing the image in a database;

(c) recording the digital data representing the compressed image on a first single-use disposable chip carried by the individual and on a second single-use chip on an object moving independently from the individual; and (d) at another location, reading the digital data recorded on the first and second chips, comparing the read digital data and authenticating a relationship between the individual and the object.

The invention has also been found to be particularly advantageous since it allows not only security at an airport or other facility in which limited accessibility is important, but because it can also significantly increase productivity at such facilities and wherever identification of a passenger and dispensing or sale of a ticket is required.

In this sense, by combining an automatic ticket dispenser with automated biometric facial passenger identifications and microchip labeling of the passenger (via the boarding pass) and the ticket, the usual passenger photo identification procedure may be eliminated or shortened.

Passengers are able to immediately secure their boarding passes and baggage tags from the dispenser along with the ticket, without having to wait on check-in lines. The passenger can then affix the tag to the baggage and place the baggage on a nearby conveyor system for automated routing to the aircraft. The passenger can then proceed directly to the departure gate. If the passenger's luggage is placed at a secure location prior to dispensing of the boarding pass, the baggage tag bearing the microchip of the invention can be readily applied directly to the baggage. Indeed, wherever there is a suspicion that baggage tags may be inappropriately used, a chip bearing the biometric passenger identification may be provided directly to the baggage, unseen by the passenger, in addition to the baggage tag. Any mismatch of the chip on the baggage tag and the chip on the baggage can be readily ascertained on scanning.

In the enhanced productivity aspect of the invention, and for airport security generally, the passenger's facial biometrics as stored on a microchip contained on their frequent flier card, drivers license, passport, credit card, or other identification is compared with the image captured by the video camera contained within the ticket-dispenser and with a data base maintained at the airport site or some central location, including possibly a data base maintained by police or other governmental authorities, ensuring fail-safe passenger identification. This immediate biometric check-in coupled with automated anti-terrorist passenger screening and the microchips embedded in both the baggage tags and boarding passes eliminates the need for the passenger to be screened by a check-in clerk. The system is, of course, fully compatible with bar code identification systems and all of the components provided with the microchip can also be barcoded if desirable and the ticket dispenser can be provided with any requisite bar code reader or printer.

This aspect of the invention provides a dramatic productivity improvement for an airline in the form of reduced manpower requirements at check-in, elimination of long check-in lines and reduced departure hall space for manned check-in facilities.

According to a feature of the invention, the digital data is reported by burning the digital data into a single-use chip which is incorporated into the baggage tag, boarding pass, identifying card or sheet or the like or which can be applied to an article without a carrying sheet at a concealed location. Advantageously, the digital data capacity of the chip is 1024 bits, with a compressed facial image utilizing, say, up to 800 bits, the balance of the digital data on the chip representing other identification information with respect to the individual such as a social security number, name, etc. The chip itself is disposable and cannot be rewritten so that forgery and fraud can be avoided.

Surprisingly, with available compression software, the acquired image, although represented by a relatively small number of bits, can be computer-matched to full images stored in a data base with a high degree of precision which practically guarantees that, in spite of the storage of hundreds of thousands or millions of faces in the data base, the computer will be able to accurately identify the owner of a compressed image acquired as described. The important aspect of the invention is that the characteristic portion of the face which is scanned to provide the image is a facial triangle comprising the eyes and nose of the individual.

While the invention is primarily intended for airport check-in and facility control and baggage/passenger matching with great precision, the invention has numerous other applications which are of equal importance.

For example, the chip can be provided on a bracelet carried by a neonate and applied at birth or to a child and can carry the facial biometrics of the mother. In the case where the mother leaves the facility, the chip can be read and matched with her actual appearance and hence the association of the child with the parent can be verified.

According to another aspect of the invention, where the scanning of the face of an individual requires the camera to pick up, for example, faces of a number of individuals in a group or crowd, the invention can additionally comprise the step of manually controlling the acquisition of the image to distinguish between the number of faces in the field of the image pick-up.

When the system is used for weapons identification, the chip can be applied or embedded in a portion of the weapon and the biometrics of the face of the purchaser can be applied thereto. Since the chip cannot be rewritten, if it is destroyed or not present or has been replaced by a chip which cannot be verified as an original chip formed at the point of sale, the possession of the weapon by the individual can be considered improper. Where the chip can be read and is the original chip, of course, it will identify the original purchaser.

The airport security system operates basically as follows: An air traveler is enrolled in the security system at initial check-in (i.e. counter or curbside) when the passenger presents a ticket and identifies himself or herself as a passenger. The check-in enrollment point, equipped with a network workstation, uses live video frame capture and advanced facial recognition software to track, locate and extract the passenger facial image to a cropped digital photo. In cases where multiple faces are within the camera's visual field, the touch screen flat panel monitor will be utilized by the check-in personnel to manually locate the eyes of the desired enrollee and automated enrollment will then follow. A duplicate copy of the digital photo as well as passenger profiling and the flight schedule generated at the workstation is sent to the network server database for storage and translation. Positive identification of the passenger's face is based upon the unique facial geometry from the stored photo image. Advanced facial recognition algorithms convert the unique facial geometry from the stored photo image into a biometric code or "face print". The algorithms containing the biometric code drawing on the uniqueness of the individual it was taken from are, by nature of their complexity, a natural encryption.

The encrypted biometric object becomes a sortable field in the server database where indexed sorts make quick work of rapid search and matching during successive passenger lookups. Passenger enrollment continues at the check workstation where the digital photo is converted to a compressed digital image file using the latest in image compression technology. The compressed image data file is destructively written (OTP) to the smart card (passive RF transponder) chip memory along with passenger information and the flight schedule. The encoded smart card carrying unique passenger information is permanently affixed to the passenger's boarding pass as well as identical smart card tags attached to each baggage item checked. The passenger enrollment process is finalized when a digital photo is sent to one or more databases controlled by the FBI, INTERPOL, or other law enforcement organizations. Once law enforcement organizations acquire the photo file from the server, they can use facial recognition software to rapidly compare for a positive match with photos of known terrorists. If there is a positive match, airport security can detain the suspect before he enters the security area or boards the aircraft.

After check-in, the baggage is sorted with RF smart card readers via the existing conveyor system that has been retrofitted with smart card readers to scan the luggage tags before loading onto the aircraft. The digital photos stored on the baggage tags are transmitted to the network server. The passenger proceeds to the carry-on security station where his digital facial image is again captured and compared with the images of passengers stored on the network server database in order to confirm that the individual entering the secure area is a registered passenger. The passenger then proceeds onward to the boarding gate. The passenger data now stored on the network server is accessible by the computer terminal at the boarding gate. The seamless noninvasive process is completed when the passenger will arrive at the gate with the boarding pass, whereupon the affixed smart card coming into proximity of the excitors/readers will be scanned (memory contents read). The compressed photo images previously extracted and stored from the baggage tag smart card memory and the real-time photo image extracted from the boarding pass smart card memory are decompressed and displayed on the network gate workstation. The photo image data read are passed back to the server for the internal rendering or biometric code of the stored facial image and compared. A split-screen Graphical User Interface (GUI) displays the facial images captured. The system software will automatically notify security personnel if the two images being validated at the boarding gate via the facial recognition software do not agree. To further enhance the security environment, a video image of the passenger can be captured at the boarding gate and compared with the existing images already stored on the server, boarding pass and baggage tags. This final comparison serves as a fail-safe means of assuring that the individual boarding the plane is the same person who originally presented and identified himself or herself at the check-in counter. In the event that the passenger will change planes at another airport, the same gate access and positive passenger baggage matching procedures will be employed.

Upon arrival at the final airport destination, the passenger baggage can be recovered using a match of the passenger images stored in the baggage tag and boarding pass smart cards as the identifiers.

The internal rendering or "facial finger print" is arrived at by processing a facial image with a complex biometric algorithm built on variation from a basic human facial model using the facial triangle comprising the eyes and nose as key identifiers. Facial geometry, when refined to very small components, paints an absolutely unique mathematical key for an individual face. The mathematical key becomes a very useful tool when placed in a sortable database for the repeat identification of an individual. Acceptance or rejection of passengers passing through the increasingly tightening security parameter surrounding departing aircraft can be decided in real time. The high confidence interval with which the latest facial recognition software repeats the facial mapping/rendering under extreme angular and luminescent conditions gives us the confidence to screen passengers for a variety of security issues. Recognition accuracy exceeds FAR:<1%FRR:<1%.

BRIEF DESCRIPTION OF THE DRAWING

The above and other objects, features, and advantages will become more readily apparent from the following description, reference being made to the accompanying drawing in which:

FIG. 3 is a diagrammatic elevational view of a baggage tag which can be used in that system;

FIG. 4 is a view similar to FIG. 3 of the boarding pass;

FIG. 9 is a process flow diagram for the automated ticketing and check-in.

SPECIFIC DESCRIPTION

Figure 1:
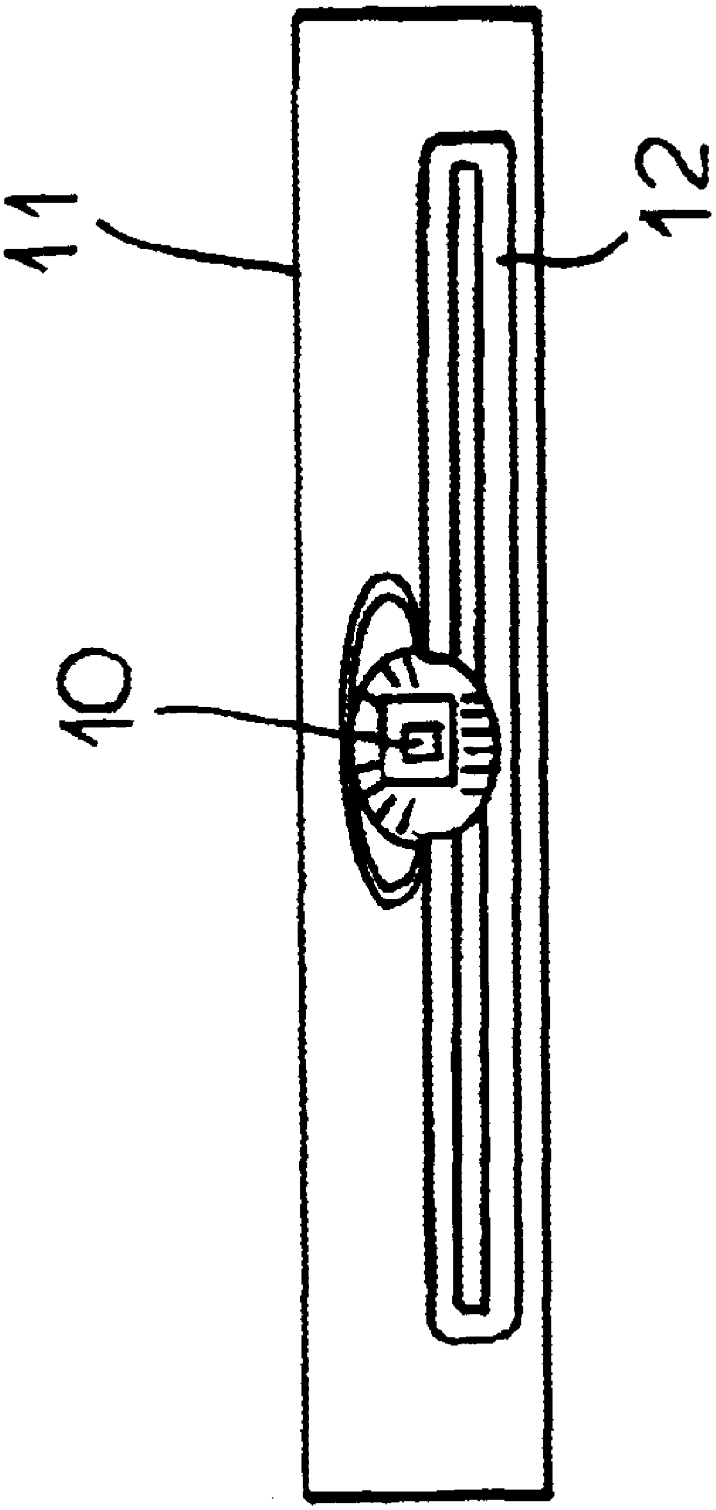
FIG. 1 is an elevational view of a microchip for the present invention greatly enlarged in scale.

As can be seen from FIG. 1, the microchip 10 can be affixed to a foil strip 11 provided with a loop 12 serving as an antenna (antenna printed to smart card label laminate material) and enabling the microchip 10, which is a single use E-PROM to be inscribed with data from a remote terminal or by mounting the microchip, on a suitable carrier, in a holder of the terminal or otherwise. FIG. 1 shows the strip 11 greatly enlarged in scale and customarily the strip will be mounted on an identification object such as a boarding pass, baggage tag, bracelet, identity card, driver's license or the like which can be referred to as a "Smart Card", and on which the microchip will be hardly noticeable or even visible.

The microchip for the purposes of the invention can carry 1024 bits and the compression software utilized as part of the biometric identification system can inscribe the microchip with up to say 800 bits representing the visual biometrics. The additional capacity of the microchip can be used to write other items of data therein such as the name, address, identification number, social security number or airline industry specific identification data (license plate) of the individual. Of importance to the invention is the fact that the microchip cannot be reprogrammed by the individual and cannot be removed without destroying it in an obvious way from its carrier and cannot be replaced by a counterfeit microchip.

Figure 2:
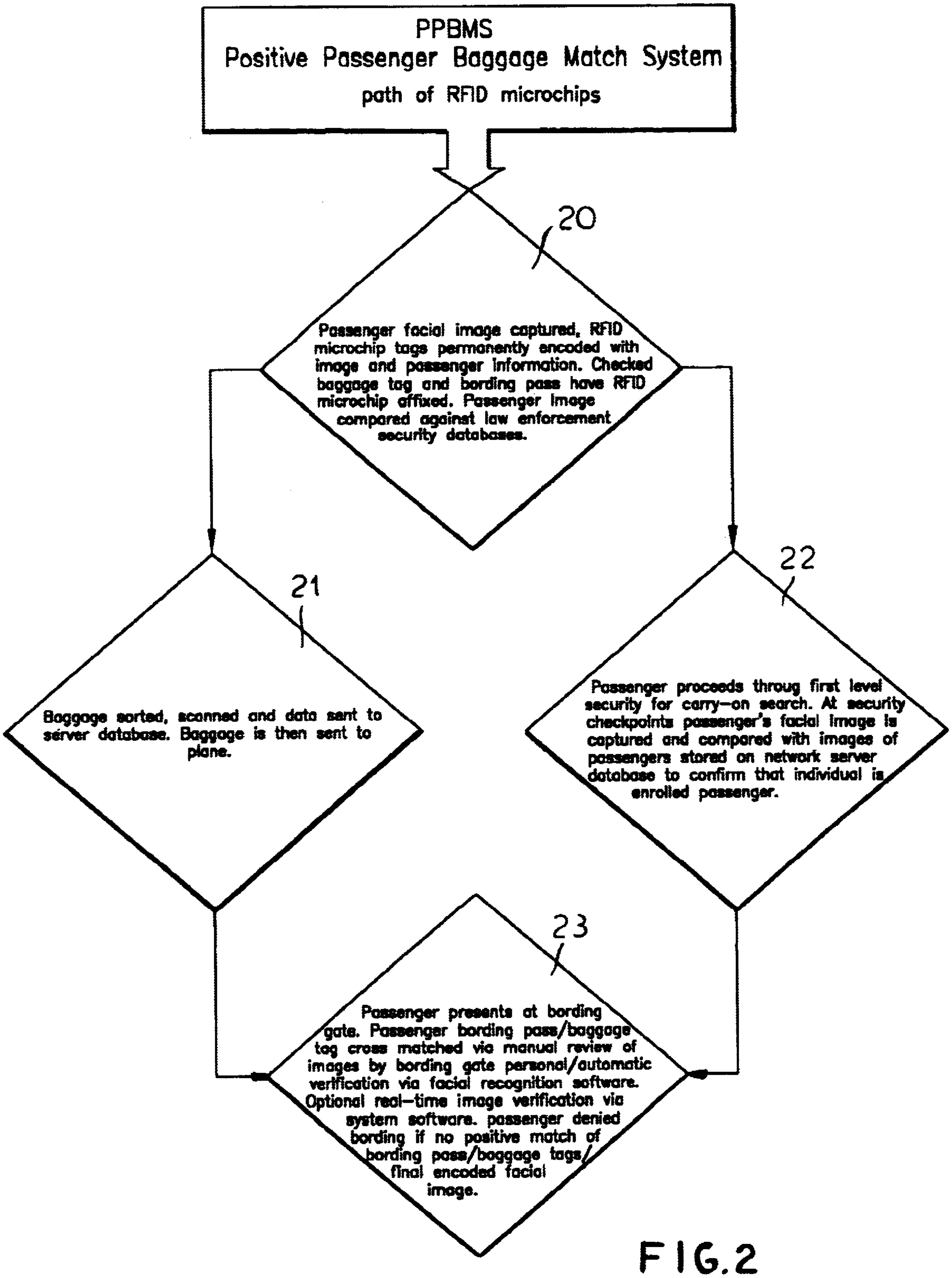
FIG. 2 is a flow diagram illustrating the baggage match system of the invention.

In the baggage match system of the invention (see FIG. 2), the facial image of the passenger is captured and data representing a biometric analysis of the triangle centered on the eyes and nose portion of the face is used to permanently encode smart card tags with the image and passenger information. The baggage tag and boarding pass for matching chips and the passenger's image is stored and compared with law enforcement security data bases. This is represented at 20 in FIG. 2.

The baggage is sorted and data as to the baggage placed on the plane is stored in the server database at 21. The passenger proceeds through the first level security for the normal carry-on search at 22, the passenger's face video captured and matched to image on data base of enrolled passengers. The face of the passenger, and/or a digital facial image of the passenger is again captured and compared with the images stored on the network server database in order to confirm that the individual entering the secure area is a registered passenger. If, of course, a security interest requires it, the passenger can be prevented from passing the first security portal. At the boarding gate 23, the boarding pass and stored baggage tag data are cross-matched and the stored image on the boarding pass is again cross-checked by the gate personnel with the appearance of the presenting passenger. Verification of the right to board is automatically provided by the facial recognition software in addition. The passenger is denied boarding if there is no positive image of the boarding pass/baggage tags/final encoded facial image/actual appearance of the passenger, and the baggage associated with that passenger is removed from the aircraft.

FIG. 3 shows a baggage tag in which the carrier 30 is of card stock and is directly provided with the microchip 31. The baggage tag can be preprinted with various indicia as represented at 32 and can have a strap or the like 33 for affixing it to the baggage. Similarly a boarding pass (FIG. 4) 40 may be composed of card stock and can carry the microchip 41 and the antenna strips 42 and can be printed with appropriate indicia as shown at 42.

Figure 5:
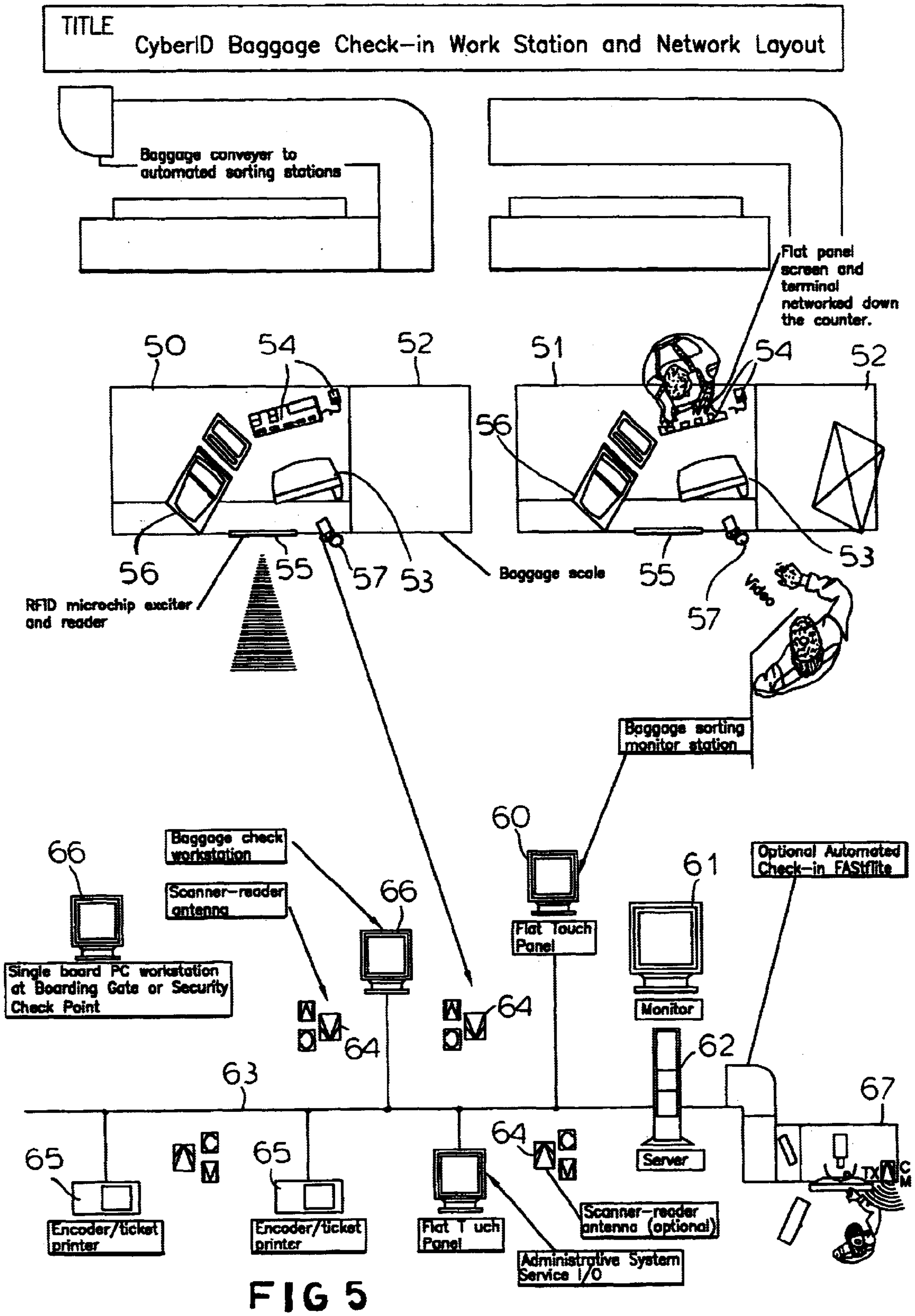
FIG. 5 is a diagram illustrating the airport security system of the invention.

FIG. 5 shows the basic system of the invention for baggage check-in and processing. As is customary for airport check-in, a number of check-in stations 50, 51 can be provided with respective baggage scales 52, flat panel screens 53 connected to the computer system, keyboard and mouse terminals 54, a smart card reader 55 and a device 56 for exciting the smart card and recording data thereon. A memory or image pick-up is represented at 57 at each station.

FIG. 5, at a lower portion shows the network layout with a baggage-sorting monitor station 60, the monitor 61 connected to the usual server 62, the data base system 63 and the various other equipment connected to the database. This can include a scanner/reader antenna 64 which is optional and such antennas can be provided at any location at the airport to effect general scanning of smart cards carried by individuals.

The encoder and ticket printer is shown at 65 and the various workstations are represented at 66. The optional FASTflite™ automated ticketing and check-in station is shown connected to the network at 67.

Figure 6:
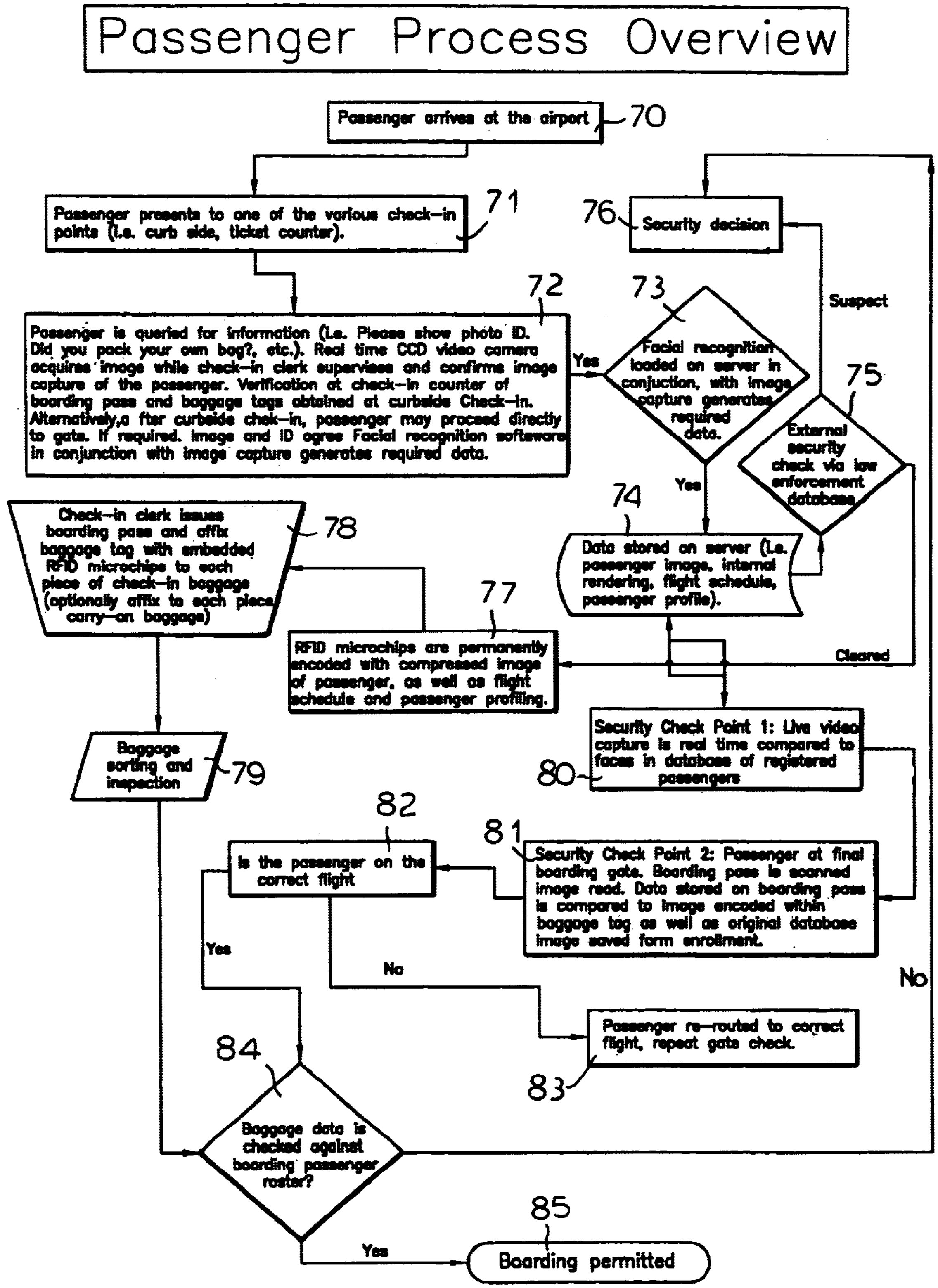
FIG. 6 is an information flow diagram illustrating the passenger processing space of the invention.

The processing of the passenger has been represented in the diagram of FIG. 6. When the passenger arrives at the airport 70, he or she can present himself or herself to a check-in point 71 which can be at curbside or a ticket counter (see FIG. 5). The passenger is queried for information and can be required to show a photo I.D., passport or the like which may previously have been encoded in the form of a smart card so that the recorded image can be matched to a face which is stored in a national or other database. He may be asked if he has packed his own luggage and whether that luggage has remained under his control the entire time since packing.

In the meantime a real-time CCD video memory acquires the image of the face of that individual and the clerk or other operator can select the face whose image is to be acquired when the memory field contains more than one face. The clerk can thus supervise and confirm image capture. Boarding pass confirmation and/or issuance and data registry of the biometric data can ensue and baggage tags can be issued and affixed to the baggage by the clerk.

If baggage tags have been obtained at curbside, the facial data stored is automatically verified by the software comparing the recorded image and the image of the passenger presenting himself to the check-in facility. If there is an image by the visual recognition software at 72 of all of the items required to be in consonance, the facial recognition is stored at 73 in the server and the stored data is associated at 74 with flight schedules, passenger profiles and the like. The security check at 75 utilizing a law-enforcement database then follows and a security decision is made at 76 should the security check turn up a suspect. If the passenger is cleared, smart cards are permanently encoded at 77 with the compressed image of the passenger, data as to the passenger and flight schedule and baggage tags are applied at 78 to all items of baggage including carry-on luggage. Naturally, if baggage tags have previously been affixed, they need not be duplicated here. The baggage is subjected to sorting and inspecting at 79.

The passenger proceeds to Security Checkpoint 1 where a live video capture of passenger is compared with data base of registered passengers to ensure that only passengers are permitted within the security zone. Thereafter, the passenger proceeds to final boarding at the gate 81, where the boarding ensues. In the final boarding at the gate 80, where the boarding pass is scanned and the image and data stored on the boarding pass is compared to the images encoded on the baggage tags and transmitted to the server and optionally with an image picked up by the CDD camera at the boarding station. Flight verification is effected at 82 and if the passenger is on the wrong flight, he or she is rerouted at 83 and the gate check is repeated at the new gate. If the passenger is on the correct flight, the baggage data is checked against the boarding passenger data at 84 and boarding is permitted at 85.

The airport security system of the invention has a number of advantages. For example, the use of contactless (RF) smart card technology with approximately IK bits writable memory allows the storage of a compressed facial image. RF communication is effected with the chip by the reader/scanner, eliminating the need for "line-of-sight" reads, as required by bar code technology. Therefore, the placement or positioning of the passenger baggage on conveyor systems or enrollment points is not a critical issue. Moreover, the RF communication protocol, particularly when used with higher frequencies such as 2.45 GHz, permits our system to read through nonmetallic baggage, thereby further enhancing the ability of CyberID to operate under less than optimal "real world" conditions. The passenger enrollment process is non-invasive and automated, unlike other identification systems that do not employ biometric facial recognition. The noisy electrical environment at airports will have no effect on the system and contactless communication with the RF microchips can be effected as distances greater than 12 inches from the reader, permitting scanning of baggage in a hold of an aircraft or in other locations with a portable reader. Chip data security is ensured because of the one-time programmable (OTP) nature of the chip.

The disposable RF microchips are obtained in the form of labels from SCS Corp. 1095 Technology Place, San Diego, Calif. 92127 under the DL-1000 "Dura-label" designation. The biometric facial recognition software is obtained from Visionics Corporation, 1 Exchange Place, Jersey City, N.J. 07302 under the "FaceIT" designation.

Figure 7:
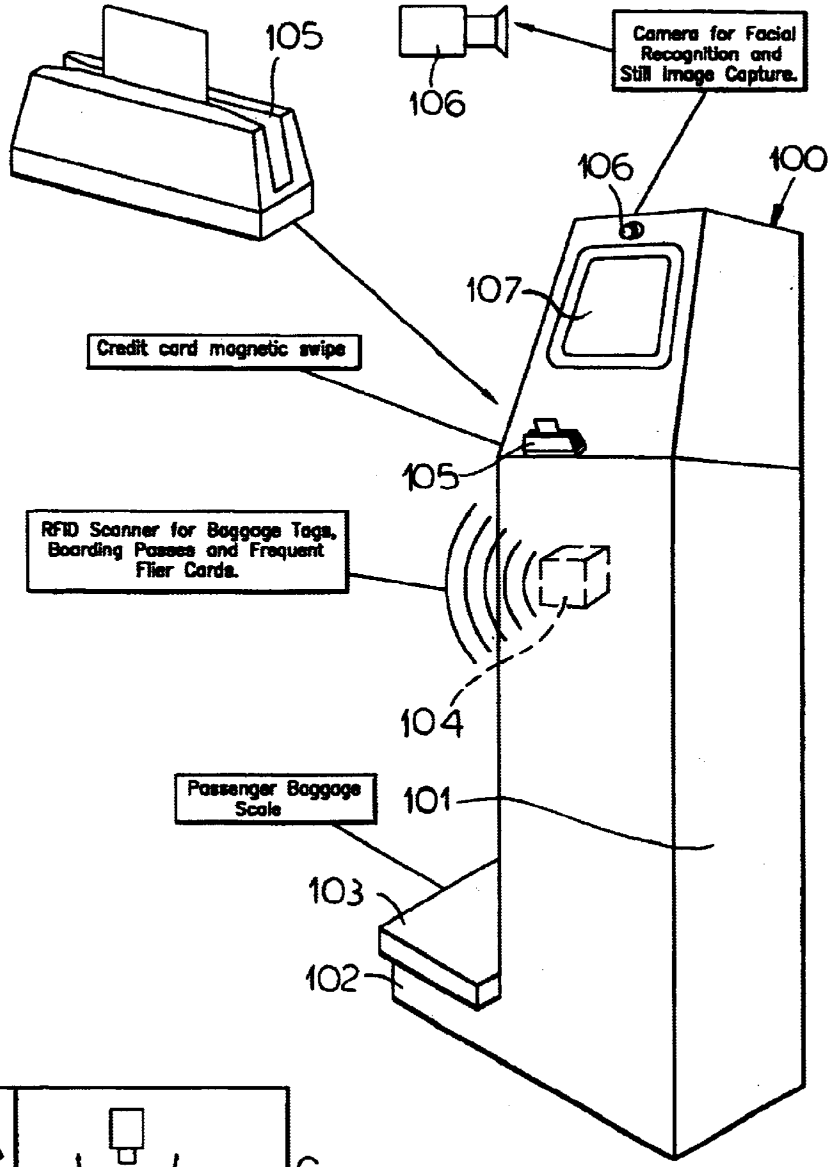
FIG. 7 is a perspective view of the automated ticketing and check-in station utilized in the present method and which has been identified by the intended proprietary designations CyberID FASTflite™.
Figure 8:
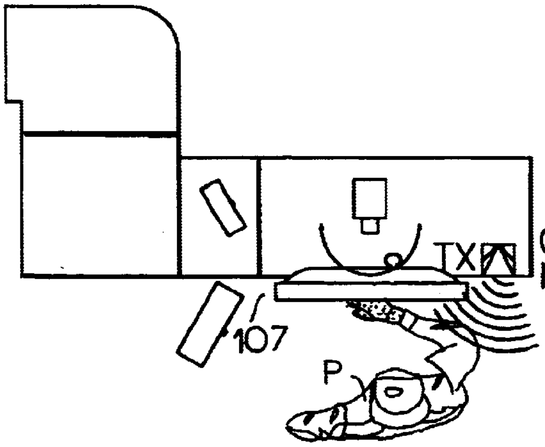
FIG. 8 is a top view illustrating its interaction as a potential passenger.

As can be seen from FIGS. 7 and 8 the automated ticketing and check-in station comprises a housing 100 house base 101 is formed with a platform 102 for a passenger baggage scale 103. Within the base, there is provided an RFID scanner for baggage tags, boarding passes and frequent flyer cards. That unit which is shown only in broken lines has been represented at 104 in FIG. 7.

At the upper part of the machine, a credit card reader 104 of the magnetic-sweep type has been shown and at the top there is a camera 106 for facial recognition and still-image capture. Between the magnetic card reader and the camera, there is a flat panel touch screen 107 for interaction with the passenger as has been shown for the passenger P in FIG. 8.

Figure 9:
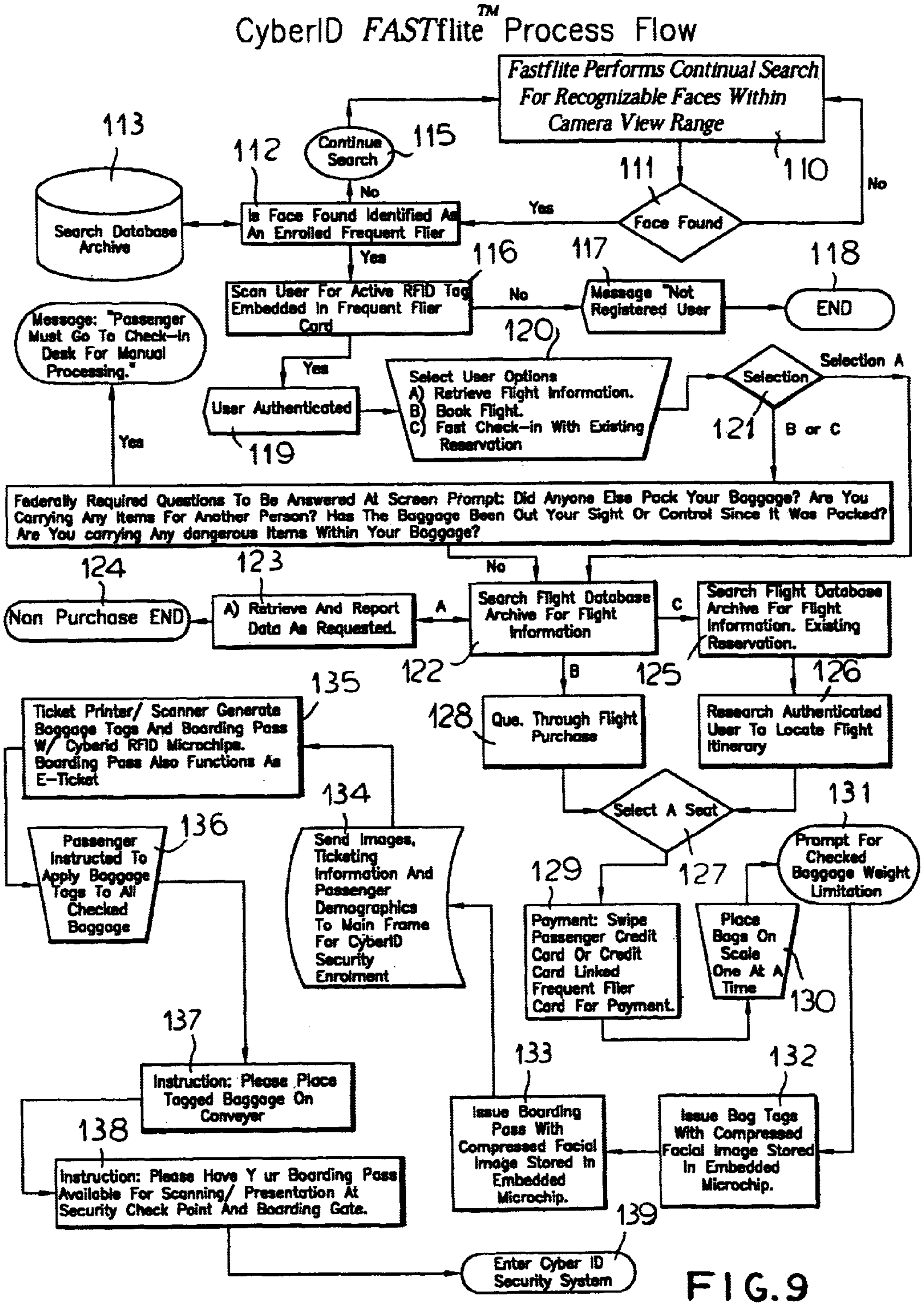

Referring now to the Process Flow diagram of FIG. 9, it will be seen that the initial operation at 110 is a pickup of the image of the passenger coupled with a continual search for recognizable faces within the camera view range. If there is recognition as determined by the decision step 111, a determination is made at 112 as to whether the individual is an enrolled frequent flier utilizing the archival data base 113. If the face has not been recognized, the process is repeated at 114 until a recognizable face is detected. Should the face not be found as an enrolled frequent flier, that search is continued as represented at 115. If, however, the face is recognized as a face of an enrolled frequent flier, the user is scanned for an active RFID tag embedded in a frequent flier card at 116. If no such active tag is found, a message is given that the individual is not a registered user at 117 and the processing of that individual ends at 118. Conversely, if the user is found to have an active tag, he or she is authenticated at 119 and can select from a number of options disclosed on the screen at 120. One of these options is the retrieval of flight information. Another option is to book a flight. A third option is fast check-in using an existing registration.

The selection at 121 in the case of selections B and C will display on the screen federally-required questions which must be actually answered. For example "Did anyone else pack your baggage?" "Are you carrying any items for another person?" "Has the baggage been out of your sight or control since it was packed?"

"Are you carrying any dangerous items within your baggage?" A no answer to any of these questions returns the data flow to a search of the flight data base for flight information at 122. Selection A, retrieval of flight information, goes directly to this stage.

A search of the flight data archive is made for flight information and a selection of flight information retrieval information is reported at 123 and the processing of the individual terminates at 124.

In the case of fast check-in with an existing registration, the search of the flight data brings up the existing registration at 125 and an authentication is given to access the flight itinerary at 126 enabling seat selection at 127. Upon a booking selection, the flight purchase procedures are initiated at 128 and again includes seat selection at 127. Payment at 129 may be by cash card, credit card or a frequent-flier card linked with a credit card and the bags are weighed at 130 and a check is made at 131 for any weight limitations.

Bag tags 132 (see also FIG. 3) are issued with compressed facial image storage in the embedded microchip and at 133 the boarding pass is issued (see FIG. 4) with its compressed facial image. Data as to ticketing information, passenger demographics and the like are then seen, with the compressed images to the main frame computer for the security checks at 134 and a ticket printer scanner system at 135 can generate the boarding passes and baggage tags and can provide the boarding pass itself as an E-ticket. The passenger can apply the baggage tags at 136 to the baggage in response to an instruction given at 137 to that effect. The passenger is warned to have the boarding pass available for scanning or presentation at the security checkpoint and boarding gate as represented at 138 and can then enter the security procedure at 139 (see FIGS. 5 and 6). When the passenger is released at the arriving airport, the boarding pass and the baggage tags can be disposed of by the passenger.

We claim:

1. An identification method comprising the steps of:

(a) at a first location, acquiring an image of a face of an individual, scanning a characteristic portion of the acquired image consisting of a facial triangle formed by the eyes and nose and wherein the eyes and nose are key identifiers of the individual, and generating a set of digital data representing a compressed image of the facial triangle of said individual and in a bit size capable of encoding a recognizable image of the face of said individual in a disposable microchip;

(b) storing said image of said face in a database;

(c) recording by radiofrequency transmission to a nonrewritable disposable passive radio frequency transponder microchip the digital data representing the compressed image of the facial triangle to form a first readable medium moving independently of said individual;

(d) at another location, reading the digital data recorded on said first readable medium, and selectively:

(d1) comparing the read digital data with images stored in said database, and displaying a stored image of a face matching the read data to verify a relationship between said individual and the first readable medium at said other location whereby the displayed image permits visual recognition of the individual by a person from the display, and (d2) comparing the read digital data with digital data representing another stored image on a second readable medium corresponding to the first readable medium but capable of moving independently of the first readable medium; and (e) reading by radiofrequency the digital data on said microchip and reconstructing an image of the face of the individual from the digital data read by radiofrequency from the microchip and visually comparing the resulting reconstructed image with the face of the individual.

2. An identification method defined in claim 1 wherein, in step (c), said microchip is incorporated into a luggage tag.

3. An identification method defined in claim 1 wherein said chip in step (c) is incorporated into a boarding pass.

4. An identification method defined in claim 1 wherein said set of digital data amounts to less than 1024 bits.

5. An identification method defined in claim 1 further comprising the step of disposing of said first readable medium following use thereof for identification of said individual.

6. The method defined in claim 1 further comprising the step of searching said database for a previously stored image of said individual in step (a).

7. The method defined in claim 1 for access to a portal, further comprising the step of permitting said individual to pass said portal upon verification in step (d).

8. The method defined in claim 1 wherein said microchip is incorporated in a bracelet applied to a neonate.

9. The method defined in claim 8 further comprising the step of incorporating said digital data into a single use chip of a bracelet applied to the mother of said neonate.

10. The method defined in claim 1 further comprising the step of manually controlling acquisition of the image of the face in step (a) to distinguish between a number of faces in a field of an image pickup device.

11. The method defined in claim 1 wherein said first readable medium is affixed to a gun and is constructed so as to be damaged upon removal from the gun.

12. The method defined in claim 1 wherein said first readable medium is affixed to an identification document.

13. The method defined in claim 1 wherein said first readable medium is affixed to a driver's licensee bank identification, credit or charge card, visa or a passport.

14. The method defined in claim 1 wherein said first readable medium is affixed to an admission pass to a particular event.

15. The method defined in claim 1 wherein said first readable medium is affixed to a vehicle identification.

16. An identification method comprising the steps of:

(a) at a first location, acquiring an image of a face of an individual, scanning a characteristic portion of the acquired image in the form of a facial triangle formed by the eyes and nose and wherein the eyes and nose are key identifiers of the individual, and generating digital data representing a compressed image of the facial triangle of said individual and in a bit size capable of encoding a recognizable image of the face of said individual in a disposable microchip;

(b) storing said image of the face in a database;

(c) recording the digital data representing the compressed image by radiofrequency transmission on a single-use nonrewritable disposable passive radiofrequency transponder chip carried by said individual;

(d) at another location, reading the digital data recorded on said chip, comparing the read digital data with images stored in said database, and displaying a stored image matching the read data on a display viewable by a person to enable that person visually to verify a relationship between said individual and chip at said other location and (e) reading by radiofrequency the digital data on said microchip and reconstructing an image of the face of the individual from the digital data read by radiofrequency from the microchip d visually comparing the resulting reconstructed image with the face of the individual.

17. An identification method comprising the steps of:

(a) at a first location, acquiring an image of a face of an individual, scanning a characteristic portion of the acquired image in the form of a facial triangle formed by the eyes and nose and wherein the eyes and nose are key identifiers of the individual, and generating digital data representing and limited to a compressed image of the facial triangle of said individual and in a bit size capable of encoding a recognizable image of the face of said individual in a disposable microchip;

(b) storing said image of the face in a database;

(c) recording the digital data representing the compressed image by radiofrequency transmission on a first single-use nonrewritable disposable passive radiofrequency transponder chip carried by said individual and on a second single-use chip on an object moving independently from the individual;

(d) at another location, reading the digital data recorded on said first and second chips, comparing the read digital data and authenticating a relationship between said individual and said object at least in part by displaying an image of the face recognizable by a person and selected from a database based upon reading of the digital data on at least one of said chips; and (e) reading by radiofrequency the digital data on said microchip and reconstructing an image of the face of the individual from the digital data read by radiofrequency from the microchip and visually comparing the resulting reconstructed image with the face of the individual.

* * * * *